April 27, 1926.

W. B. WILLS

FRYING BASKET

Filed Feb. 12, 1926

1,582,109

Inventor
Walter Bruce Wills
By E. Watson Brewington
Attorney

Patented Apr. 27, 1926.

1,582,109

UNITED STATES PATENT OFFICE.

WALTER BRUCE WILLS, OF BALTIMORE, MARYLAND.

FRYING BASKET.

Application filed February 12, 1926. Serial No. 87,930.

*To all whom it may concern:*

Be it known that I, WALTER BRUCE WILLS, a citizen of the United States, residing at Baltimore city, State of Maryland, have invented certain new and useful Improvements in Frying Baskets, of which the following is a specification.

This invention relates to cooking utensils and has special reference to frying baskets and the like.

More particularly the invention relates to an improvement on my copending application for patent on frying baskets, filed September 30, 1925, and bearing the Serial Number 59,514, the improvement being particularly in the rear or handle carried leg of such a basket.

Experience has shown that, in many instances it is desirable to have two points of support at the handle side of the basket during the draining operation.

One object of the present invention is to provide an improved arrangement of supporting member at the handle side of the basket for affording two points of support at this side.

A second object of the invention is to provide a novel arrangement of means for protruding and housing such supporting member.

A third object of the invention is to provide a novel form of such support and guides therefor.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1:
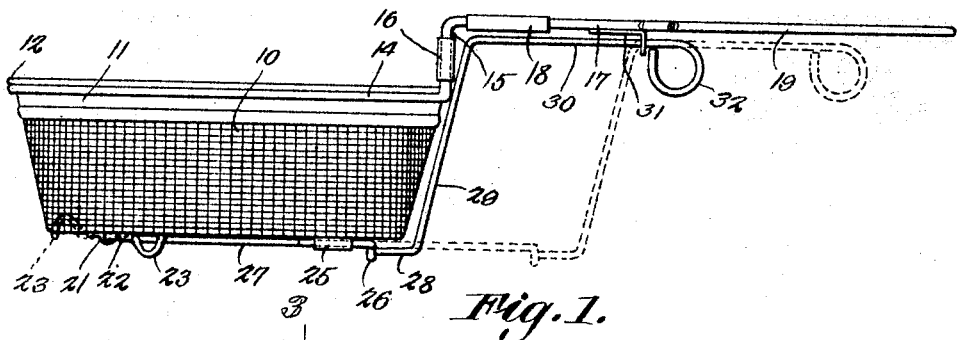
Figure 1 is a side elevation of a frying basket constructed in accordance with this invention.
Figure 2:
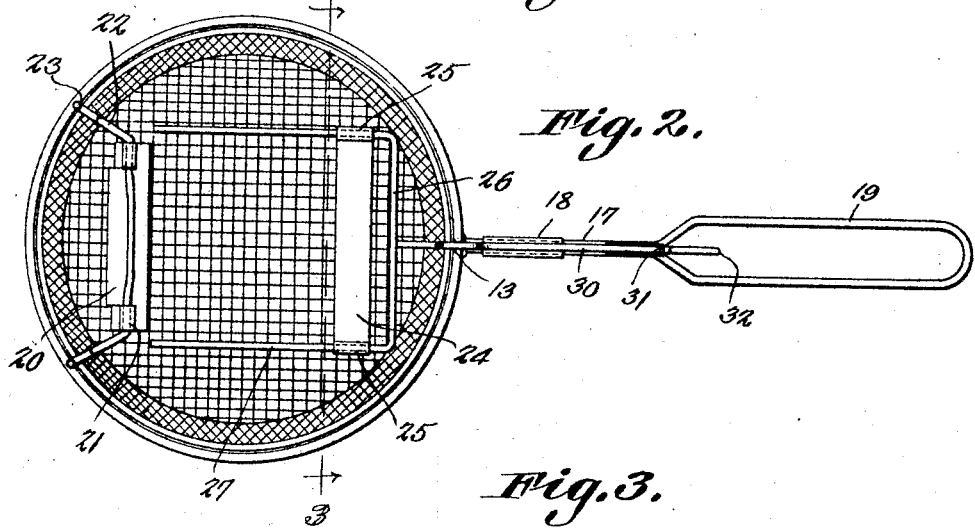
Figure 2 is a bottom plan view thereof.
Figure 3:
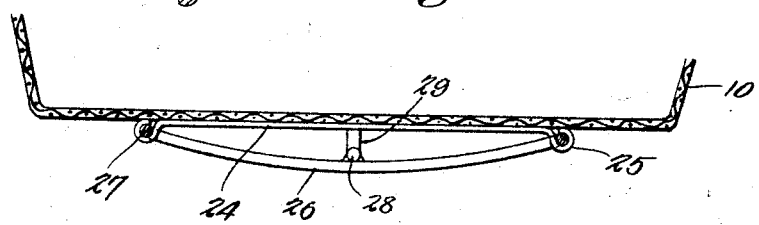
Figure 3 is a section on the line 3—3 of Figure 2, the section being to an enlarged scale.

The improvement is shown applied to a frying basket similar to that shown in the aforesaid copending application and there is accordingly disclosed a woven wire basket or body 10 of frusto-conical form and having its upper edge bound and reinforced by a band 11 provided at its upper edge with an out turned flange 12. This flange is interrupted at the point from which the handle extends as shown at 13.

Around the band 11 beneath the flange 12 extends a wire 14 and at the gap 13 the wire extends upwardly through said gap in parallel portions 15. Around these parallel portions extends a split sleeve or band 16 which is crimped to closely engage the portions 15 and hold them tightly together so that the wire 14 can neither slip off the basket nor turn around it. At the upper ends of the portions 15 the wire is bent away from the basket to provide parallel portions 17 which are bound together by a ring or sleeve 16. Beyond the ring 18 the handle grip 19 is formed having parallel sides, converging front portions meeting the portions 17 and a curved extremity.

Below the bottom of the basket or body is a reinforcing plate 20 which is provided with loops 21 forming bearings. Extending through these bearings below the bottom is the middle part of the front supports which consist of a single length of wire bent to form arms 22 offset at their center to form a spring and provided with hook ends 23 as in Figure 1. These features are common in this structure and that of the copending application aforesaid.

In the construction of the novel two point support and its operating means there is provided on the bottom of the basket a plate 24 which is positioned adjacent the handle side of the basket and parallel to the plate 20. At each end this plate is rolled transversely of its length to form guide sleeves 25, the construction being such that these sleeves are parellel. The novel support consists of a single length of wire or rod having a central downwardly bowed portion 26 from the ends of which project forwardly extending legs 27 which pass through and are guided by the sleeves 25. The lengths of these legs is such that the central portion may either be housed beneath the bottom of the basket or drawn out so that the legs engage the top of a drip pan or other utensil, the bowed portion being outside the upper edge of such pan and thereby preventing the legs from accidental movement toward housing position. To move this support in and out there is provided a rod having a lower end 28 parallel to the bottom of the basket and having its forward extremity suitably secured to the center of the bowed portion 26. This rod has an intermediate portion 29 which extends upwardly from the rear end of the portion 28 substantially parallel to the basket side and, just below the handle the rod is continued rearwardly as at 30 to pass through a suitable opening in an angle bracket 31 fixed to the under side of the handle intermediate the length thereof. At its rear end the rod terminates in a coil 32 forming a finger grip. Thus by pulling rearwardly on the finger grip the rod and support may be moved to protruded position as shown in dotted lines in Figure 1 while pushing forwardly on the finger grip will move the support to housed position as shown in said figure.

There has thus been provided a simple and efficient device of the kind described and for the purpose specified.

Having thus described the invention, what is claimed as new, is:

1. In combination with a frying basket having a body provided with a bottom and a handle projecting from one side of said body; of a support slidably mounted on the under side of said bottom and movable into housed position beneath the bottom and into protruded position to extend partly from beneath the bottom, said support comprising a single length of wire having a central portion and legs extending at right angles thereto, guides carried by said bottom engaging said legs, and means connected to said central portion and terminating adjacent said handle for moving the support between housed and protruded position.

2. In combination with a frying basket having a body provided with a bottom and a handle projecting from one side of said body; of a support slidably mounted on the under side of said bottom and movable into housed position beneath the bottom and into protruded position to extend partly from beneath the bottom, said support comprising a single length of wire having a downwardly bowed central portion and legs extending at right angles thereto, guides carried by said bottom engaging said legs, and means connected to said central portion and terminating adjacent said handle for moving the support between housed and protruded position.

3. In combination with a frying basket having a body provided with a bottom and a handle projecting from one side of said body; of a support slidably mounted on the under side of said bottom and movable into housed position beneath the bottom and into protruded position to extend partly from beneath the bottom, said support comprising a single length of wire having a central portion and legs extending at right angles thereto, a plate mounted on said bottom and having its ends rolled to provide parallel sleeves through which said legs pass, and means connected to said central portion and terminating adjacent said handle for moving the support between housed and protruded positions.

In testimony whereof I affix my signature.

WALTER BRUCE WILLS.